(12) United States Patent
Widemann et al.

(10) Patent No.: US 11,300,055 B2
(45) Date of Patent: Apr. 12, 2022

(54) METHOD FOR DETECTING THE IGNITION OF A TURBINE ENGINE

(71) Applicant: SAFRAN AIRCRAFT ENGINES, Paris (FR)

(72) Inventors: Adel Cédric Abir Widemann, Moissy-Cramayel (FR); Nicolas Raillard, Moissy-Cramayel (FR); Cedrik Djelassi, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 159 days.

(21) Appl. No.: 16/772,439

(22) PCT Filed: Dec. 13, 2018

(86) PCT No.: PCT/FR2018/053278
§ 371 (c)(1),
(2) Date: Jun. 12, 2020

(87) PCT Pub. No.: WO2019/115964
PCT Pub. Date: Jun. 20, 2019

(65) Prior Publication Data
US 2021/0071582 A1     Mar. 11, 2021

(30) Foreign Application Priority Data

Dec. 13, 2017  (FR) ...................... 1762059

(51) Int. Cl.
*F02C 7/264* (2006.01)
*F01D 19/02* (2006.01)

(52) U.S. Cl.
CPC .............. *F02C 7/264* (2013.01); *F01D 19/02* (2013.01); *F05D 2260/80* (2013.01);
(Continued)

(58) Field of Classification Search
CPC .. F01D 19/00; F01D 19/02; F02C 7/26; F02C 7/264; F05D 2260/80; F05D 2260/85;
(Continued)

(56) References Cited

U.S. PATENT DOCUMENTS 7,269,953 B2 *  9/2007  Gadde .................. F01D 17/162
                                               60/39.27
8,925,328 B2 *  1/2015  Rodd ...................... F01D 19/00
                                               60/778

(Continued)

FOREIGN PATENT DOCUMENTS

WO         2014/037649 A1       3/2014

OTHER PUBLICATIONS

Search Report dated Sep. 12, 2018 from French Patent Office in FR Application No. 1762059.
(Continued)

*Primary Examiner* — Jesse S Bogue
(74) *Attorney, Agent, or Firm* — Sughrue Mion, PLLC

(57) ABSTRACT

The invention relates to a method (E) for detecting the ignition of a turbine engine combustion chamber, the method (E) comprising the steps of: receiving (E11) a first measurement of the exhaust gas temperature downstream from the combustion chamber, before an attempt to ignite said combustion chamber; receiving (E12) a temperature threshold; receiving (E13) a secondary detection criterion; updating (E14) the received temperature threshold as a function of the secondary detection criterion received; receiving (E15) a second measurement of the exhaust gas temperature, after the attempt to ignite the combustion chamber; comparing (E16) the updated temperature threshold with the difference between the first and second exhaust gas temperature measurements; and determining (E17) the state of ignition of the combustion chamber.

10 Claims, 4 Drawing Sheets

Figure 2C:
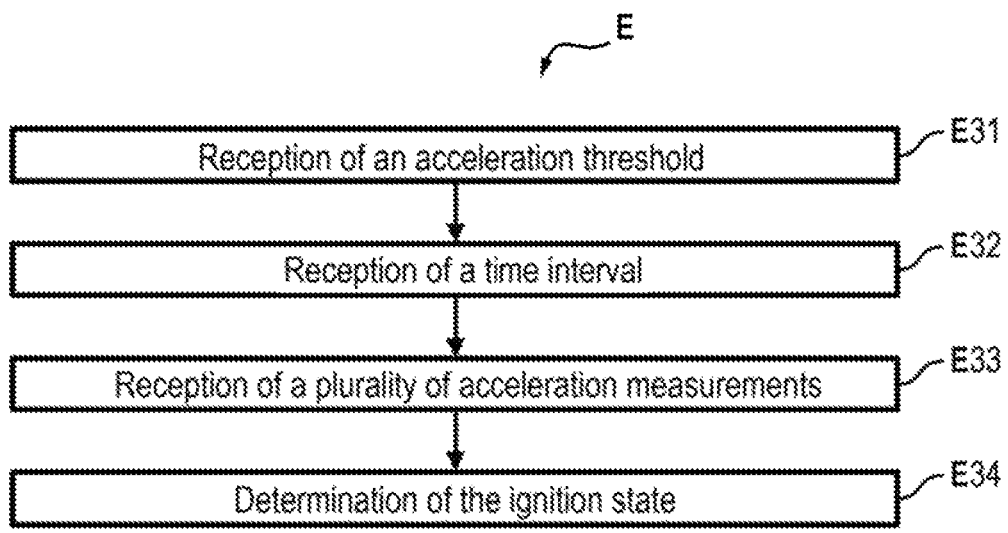

(52) U.S. Cl.
CPC ...... *F05D 2260/85* (2013.01); *F05D 2260/99* (2013.01); *F05D 2270/301* (2013.01); *F05D 2270/303* (2013.01); *F05D 2270/304* (2013.01)

(58) Field of Classification Search
CPC ........... F05D 2260/99; F05D 2270/301; F05D 2270/303; F05D 2270/304
See application file for complete search history.

(56) References Cited

U.S. PATENT DOCUMENTS

| | | | |
|---|---|---|---|
| 10,641,179 B2* | 5/2020 | Hayama | F02C 7/262 |
| 2004/0200207 A1* | 10/2004 | McKelvey | F02C 9/32 |
| | | | 60/39.281 |
| 2007/0051111 A1 | 3/2007 | Uluyol et al. | |
| 2012/0006032 A1* | 1/2012 | Kopcho | F01D 21/003 |
| | | | 60/772 |
| 2015/0300918 A1 | 10/2015 | Greubel | |
| 2016/0305329 A1 | 10/2016 | Saito | |

OTHER PUBLICATIONS

International Search Report for PCT/FR2018/053278, dated Apr. 25, 2019.

* cited by examiner

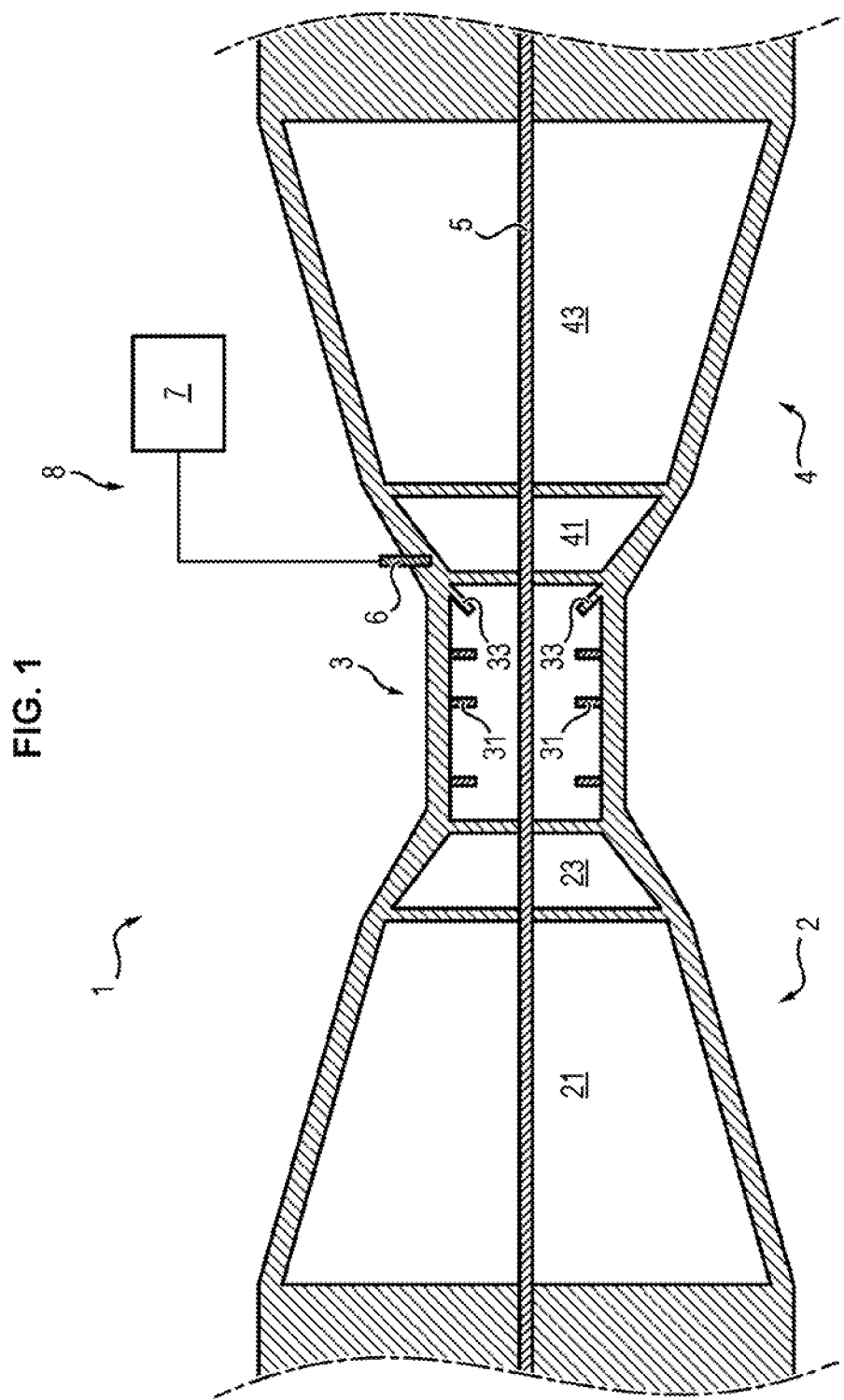

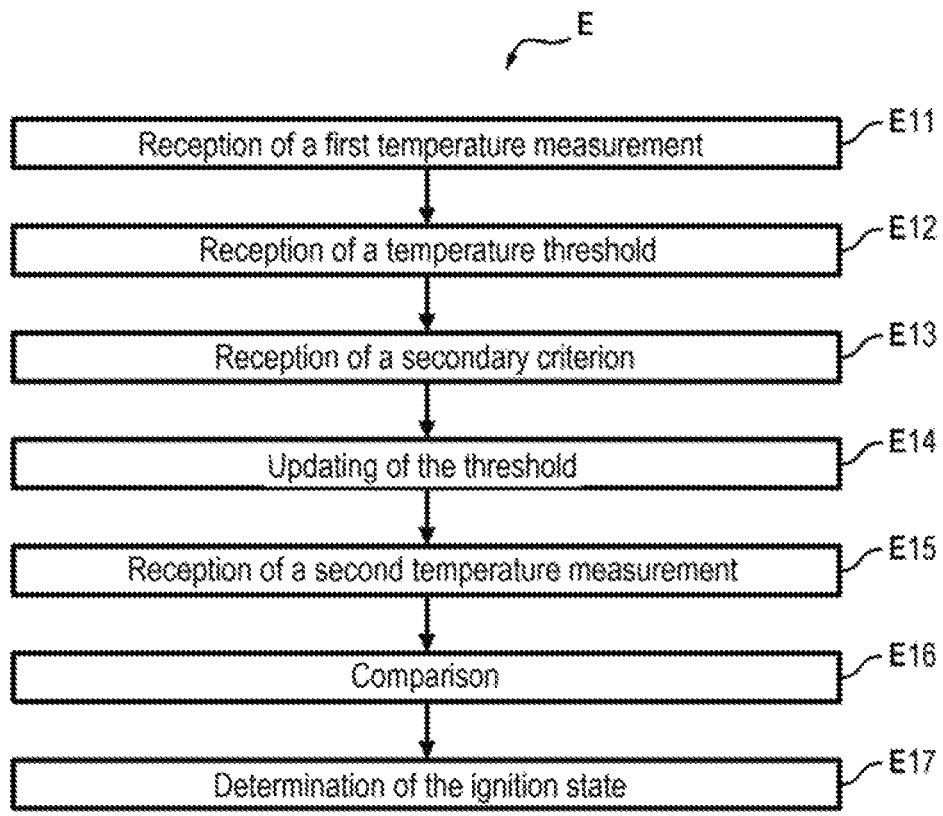
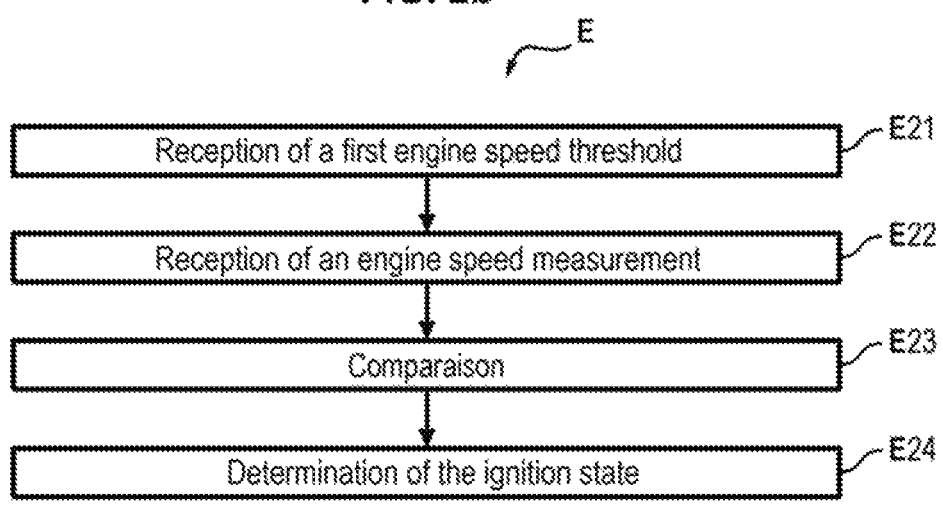

METHOD FOR DETECTING THE IGNITION OF A TURBINE ENGINE

CROSS REFERENCE TO RELATED APPLICATIONS

This application is a National Stage of International Application No. PCT/FR2018/053278 filed Dec. 13, 2018, claiming priority based on French Patent Application No. 1762059 filed Dec. 13, 2017, the entire contents of each of which are herein incorporated by reference in their entireties.

TECHNICAL FIELD

The invention relates to a method for detecting the ignition of a turbine engine.

The invention relates more specifically to a method of detecting the ignition of a combustion chamber of a turbine engine based on the exhaust gas temperature. In particular, the invention relates to determining, in real time, the ignition state of the combustion chamber, corresponding to the success or failure of an attempted ignition.

PRIOR ART

A known turbine engine, such as an aircraft turbojet, conventionally comprises a compressor, a combustion chamber and a turbine, aligned in this order from upstream to downstream, relative to the air flow direction in the turbine engine. The combustion chamber takes in air previously compressed by the compressor, injects fuel into it, and fires the mixture which then expands through the turbine to finally be ejected so as to, for example, generate the thrust necessary for the movement of the aircraft. A part of the energy generated within the combustion chamber is further tapped by the turbine in order to drive the compressor in rotation.

The detection of ignition in the combustion chamber is an essential criterion. In fact, it conditions the actions to be undertaken for the purpose of a successful start, or for restarting the turbojet in flight.

Following the ignition in the combustion chamber, a flow of hot air called "exhaust gases" flows through the turbine engine, which causes a rapid increase of the temperature downstream of the combustion chamber, particularly in the turbine and its casing. It is therefore known to place at this location one or more temperature sensor(s) in order to measure the evolution of the exhaust gas temperature (EGT).

A known method of detecting ignition in the combustion chamber consists of monitoring EGT measurements supplied by these sensors. Several control logics can moreover be implemented in parallel, for example by a computer of the turbine engine.

Regardless of currently known control logic, the turbine engine will be considered as being "lit" if the EGT has increased by a certain level since the beginning of fuel injection. For this purpose, the EGT value is first stored, for example upon initiation of the starting sequence. Following the fuel injection and the spark plug discharge (i.e. once the ignition speed is attained), the successive EGT measured values are compared with the stored value. If a predetermined increase threshold is attained, ignition is detected in the combustion chamber. In this case, the ignition control laws change in favor of control laws relating to acceleration, or spooling, of the turbine engine, until idle speed is attained. On the other hand, if the EGT values do not exceed this threshold after a predetermined length of time, an alarm indicating that the combustion chamber is not ignited is reported to the pilot.

It is possible however that the EGT has already increased before starting. This phenomenon appears for example when a first ignition attempt has been implemented, then interrupted, or following a rotating stall linked to aerodynamic instability of the compressor. In this case, when the ignition of the combustion chamber has taken place, the EGT values are already too high and do not evolve in the same manner as in the nominal case. The expected EGT increase threshold has therefore not been able to be attained in time and the start has been incorrectly interrupted when the engine was in fact ignited.

There exists therefore a need for improving the method of detecting ignition in the combustion chamber, particularly in the case where the exhaust gas temperature is higher than normal at the moment of fuel injection and spark plug discharge.

Known furthermore is publication FR3044703A1, dealing with a method for determining an instant at which the ignition occurs in a turbine engine combustion chamber during a successful ignition attempt. The method thus allows determining the duration of ignition, which can be used as an indicator of the degradation of the overall starting system of the turbine engine in the case, in particular, of confirmed deviation relative to a reference duration. The logic of the method is applied to data recorded during a flight mission and which are generally processed after the mission to allow monitoring the state of health ("health state") of the turbine engine. Real-time application of the method remains possible, but requires in particular considerable computing resources.

SUMMARY OF THE INVENTION

One goal of the invention is to detect the ignition of a turbine engine combustion chamber in the case of restarting the turbine engine, on the ground or in flight.

Another goal of the invention is to detect the ignition of a turbine engine combustion chamber following a rotating stall of the air at the output of the compressor.

Another goal of the invention is to detect the ignition of a turbine engine combustion chamber in the event of disability of the exhaust gas temperature probe.

Another goal of the invention is to detect the ignition of a turbine engine combustion chamber in the event of an untimely fuel supply cutoff.

Another goal of the invention is to detect the ignition of a turbine engine combustion chamber in the event of re-initialization of one or more channels of the computer, during starting or in flight.

The invention proposes in particular a method for detecting the ignition of a turbine engine combustion chamber, the method comprising the steps of:
  receiving a first measurement of the exhaust gas temperature downstream of the combustion chamber, before an attempt to ignite said combustion chamber,
  receiving a temperature threshold,
  receiving a secondary detection criterion,
  updating the temperature threshold received depending on the secondary detection criterion received,
  receiving a second measurement of the exhaust gas temperature after the attempt to ignite the combustion chamber, comparing the updated temperature threshold and the difference between the first and the second measurement of the exhaust gas, and determining the ignition state of the combustion chamber, corresponding to the success or to the failure of the ignition attempt, depending on the result of the comparison step.

In a method of this type, the step of updating the temperature detection threshold advantageously allows taking into account the operating state of the turbine engine which influences the starting of the combustion chamber. In this manner, the evolution of the exhaust gas temperature is not an absolute detection criterion, but becomes relative to the overall state of the turbine engine. Depending on secondary criteria relative to the elements which surround the combustion chamber, such as for example the engine speed or the compressor output pressure, the evolution of the exhaust gas temperature differs from its nominal evolution, even though the ignition state is the same. Thanks to a method of this type, the alarm taking ignition into account which is reported to the pilot is no longer biased, which reduces the number of erroneous identifications of ignition or re-ignition failure, on the ground or in flight.

The method according to the invention can further comprise the following features, taken alone or in combination:
the step of receiving a first measurement of the exhaust gas temperature is implemented at the end of a phase of initiation of the starting sequence of the turbine engine, when the exhaust gas temperature is minimal,
the updating of the temperature threshold consists of a reduction of the value of said threshold if the secondary criterion is validated, and the retention of the value of said threshold otherwise,
the secondary criterion is information relating to the evolution of the high-pressure compressor output pressure of the turbine engine, the secondary criterion being validated if a sudden increase of said pressure is detected,
the secondary criterion is information relating to the engine speed of the turbine engine, the secondary criterion being validated if the engine speed is comprised in a determined interval for a predetermined duration,
it further comprises steps of:
receiving a first engine speed threshold,
receiving a measurement of the engine speed,
comparing the measurement to the first engine speed threshold, and
determining the ignition state of the combustion chamber depending on the result of the comparison step,
it further comprises steps of:
receiving an acceleration threshold of the engine speed,
receiving a measurement time interval,
receiving a plurality of successive measurements of the acceleration of the engine speed during the measurement time interval received in the preceding step, and
comparing the plurality of successive measurements with the acceleration threshold received, and
determining the ignition state of the combustion chamber depending on the result of the comparison step, and
it further comprises the steps of:
receiving a second engine speed threshold,
receiving information relating to the control state of the turbine engine,
receiving a measurement of the engine speed,
comparing the measurement to the second engine speed threshold, and
determining the ignition state of the combustion chamber depending on the result of the comparison step and the information relating to the control state.

The invention further relates to a system for detecting the ignition of a turbine engine combustion chamber, the system comprising an exhaust gas temperature sensor, the system further comprising a computer configured to implement a method as previously described.

Finally, the invention applies to a turbine engine comprising a system as previously described.

RAPID DESCRIPTION OF THE FIGURES

Figure 2D:
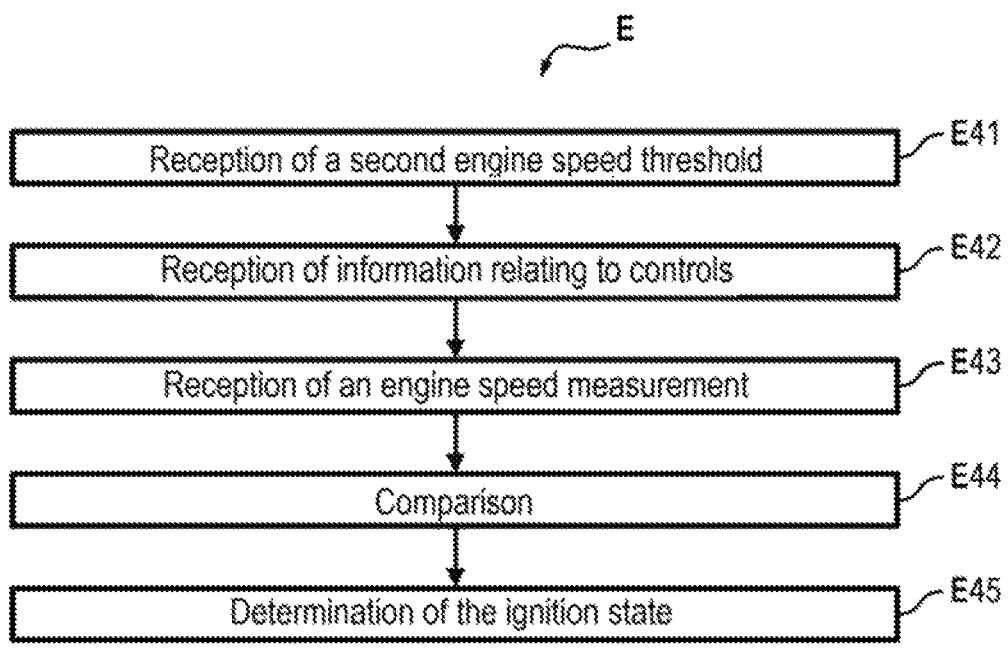
Figure 3:
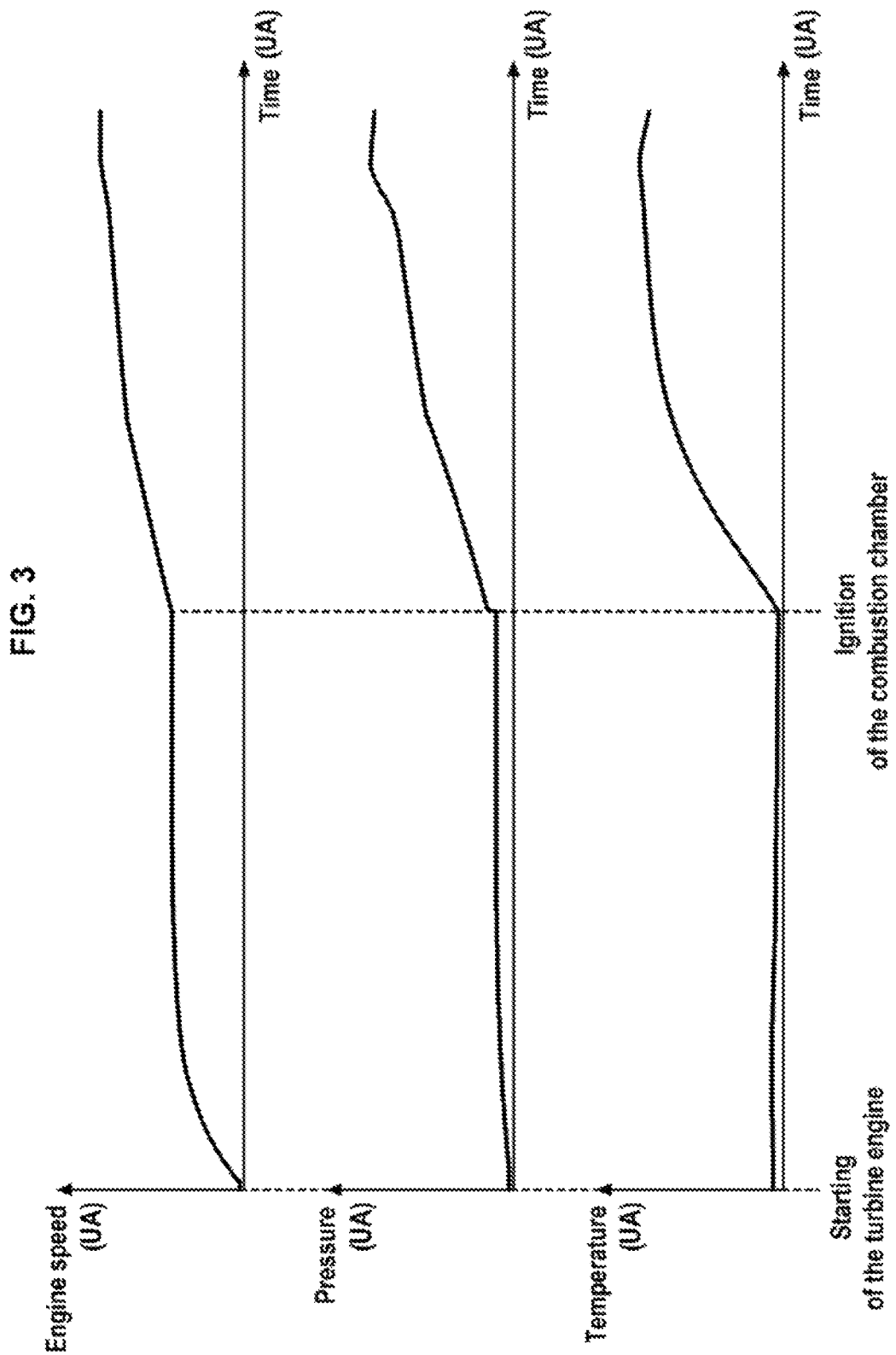

Other features, aims and advantages of the present invention will appear upon reading the detailed description that follows and with reference to the appended drawings, given by way of non-limiting examples and in which:

FIG. 1 illustrates schematically a known turbine engine comprising an exemplary embodiment of a detection system according to the invention, FIGS. 2a to 2d illustrate schematically different embodiments of a detection method according to the invention, and FIG. 3 illustrates examples of evolution of the engine speed, of the exhaust gas temperature and of the output pressure of the high-pressure compressor during starting of the turbine engine.

DETAILED DESCRIPTION OF THE INVENTION

An exemplary embodiment of a method according to the invention will now be described, with reference to the figures.

With reference to FIG. 1, a known turbine engine 1, such as an aircraft turbojet, comprises a combustion chamber 3, the ignition of which is essential to starting, or restarting the turbine engine 1 on the ground or in flight. The combustion chamber 3 is located between a compressor 2 section, called the high-pressure compressor, and a turbine 4 section called the high-pressure turbine, connected to each other by a rotating shaft 5 called the high-pressure shaft. Each of the compressor 2 and turbine 4 sections can further comprise, in known fashion, several high-pressure stages, respectively 21, 23, and 41, 43, connected to one another by the same rotating shaft 5, to form a high-pressure body of a two-body turbine engine. In operation, air is compressed by the compressor section 2, then circulates in the combustion chamber 3 within which fuel is injected by injectors 31 configured for this purpose. The fuel-air mixture is then ignited by the action of spark plugs 33. The products of this combustion, called exhaust gases, are then expanded through the turbine 4 section. Hereafter, the air circulating through the turbine 4 section, downstream of the combustion chamber, will be designated "exhaust gas," whether this air has previously been ignited within the combustion chamber 3 (nominal operation), or not (initiation of the starting sequence). The exhaust gas temperature is therefore directly linked to the temperature of the turbine 4 section and indicates the ignition state of the combustion chamber 3.

Generally, the starting sequence of the turbine engine 1 comprises a first phase during which the speed of rotation of the rotating shaft 5 increases over a time range comprised between the reception of an order for starting the turbine engine 1, for example originating with the pilot, and an instant when the injection of fuel into the combustion chamber 3 of the turbine engine 1 begins. During this first phase, the driving of the rotating shaft 5 is implemented independently of the action of the turbine 4 section, for example by means of a starter (not shown). This first phase can then be qualified as the pre-injection phase.

Moreover, the starting sequence comprises a second phase, subsequent to the first phase, which ends when the rotating shaft is no longer driven independently of the action of the turbine 4 section, for example by disengaging the starter clutch. This second phase begins with the ignition of the fuel-air mixture in the combustion chamber 3, and can be qualified as the post-ignition phase.

Hereafter, a phase of initiation of the starting sequence preferably corresponds to the first phase described above, called the pre-injection phase, which continues until the instant when the ignition of the fuel-air mixture starts.

When starting on the ground, the turbine engine 1 is first driven by the starter (not shown) in order to compress enough air to allow the success of the combustion chamber 3 ignition. During a restart in flight, if the engine speed of the turbine engine is sufficiently high (a phenomenon called "windmilling"), the ignition of the combustion chamber 3 can be directly implemented. Otherwise, it is necessary to have recourse to the starter, as during starting on the ground. During starting as during restarting, the ignition of the combustion chamber 3 is implemented by injection of fuel and discharge of the spark plugs 33.

In a first embodiment, with reference to FIG. 2a, the detection method E comprises a first step E11 of receiving a first measurement MT1 of the exhaust gas temperature, called the initial measurement, before an attempt to ignite the combustion chamber 3. This initial measurement MT1 serves as a reference for controlling the ignition of the combustion chamber 3. That is the reason for which the initial measurement MT1 is generally stored for the purpose of subsequent comparison, as will be described more precisely.

Advantageously the step of receiving E11 the initial measurement MT1 is implemented at the end of a phase of initiation of the starting sequence of the turbine engine 1. It is in fact important to store the minimum value of the exhaust gas temperature attained after launching the starting, or restarting sequence of the turbine engine 1. Thus, when said sequence is initiated, the driving of the rotating shaft 5 by the starter, of windmilling, generates a circulation of air in the turbine engine 1 which is thus ventilated and progressively cooled, as illustrated in FIG. 3. The exhaust gas temperature therefore drops during the initial starting sequence of the turbine engine 1 so that, when the ignition of the combustion chamber 3 is implemented, the exhaust gas temperature is minimal. This allows benefiting from an initial reference measurement which is the exact image of the temperature of the combustion chamber 3 at the time of its ignition.

During a second step E12, a temperature threshold ST is received and also, according to a favored embodiment, stored. This temperature threshold ST supplies a reference for the increase of the exhaust gas temperature at which it is considered that the combustion chamber 3 is ignited. This temperature threshold ST depends on the turbine engine 1, on its state of wear, and on its operating conditions. Advantageously this temperature threshold ST is 35 K.

During a third step E13, a secondary detection criterion CS is received and, according to a favored embodiment, stored. The secondary detection criterion CS allows determining a state of the turbine engine 1 which has an influence on the exhaust gas temperature. Depending on the validation criteria, the secondary detection criterion CS thus allows correcting the value of the temperature threshold ST received in the preceding step E12 in order to improve the detection of the ignition of the combustion chamber 3 based on the evolution of the exhaust gas temperature.

During a fourth step E14, the temperature threshold ST is updated depending on the secondary detection criterion CS received in the preceding step E13. Advantageously, the update consists of a reduction in the value of said threshold ST if the secondary criterion CS is validated, and of the retention of the value of said threshold ST otherwise. In fact, when the secondary criterion CS is validated, the turbine engine 1 is potentially in an operating state such that the exhaust gas temperature does not follow a nominal evolution, for example it has already increased independently of the ignition of the combustion chamber 3. This could have been due to a first aborted start, or to a separation phenomenon downstream of the compressor section 2. Thus the reduction in the value of the threshold ST allows detecting the ignition of the combustion chamber 3 more rapidly, or even ensuring that the ignition of the chamber 3 is detected. Likewise, the updating of the value of the temperature threshold ST depends on the turbine engine 1, on its state of wear, and on its operating conditions. Advantageously, when the secondary criterion CS is validated, the value of the updated temperature threshold ST is 15K.

During a fifth step E15, a second temperature measurement MT2 of the exhaust gases is received after the attempted ignition of the combustion chamber 3 and, according to a favored embodiment, stored. Advantageously, a plurality of second temperature measurements MT2 of the exhaust gases is successively received.

During a sixth step E16, the updated temperature threshold ST is compared to the difference between the second MT2 and first MT1 measurements of the exhaust gas temperature received in the previous steps. Advantageously, the sixth step E16 is repeated successively with the plurality of second measurements MT2.

During a last step E17, the ignition state of the combustion chamber is determined depending on the result of the previous comparison step E16. More precisely, if the difference between the second MT2 and the first MT1 temperature measurement of the exhaust gases is greater than the updated temperature threshold ST, then the combustion chamber 3 is considered to be ignited. Otherwise, it is considered to be extinguished. Consequently, the state E17 allows concluding the success or the failure of the attempted ignition of the combustion chamber 3 of the turbine engine 1. If necessary, an alarm can be reported to the pilot if the extinguished state is determined following several ignition attempts.

The steps of the first embodiment of the detection method E can be implemented in a different order from that previously described. In particular, the step E12 of receiving the temperature threshold ST can be implemented independently of the steps of receiving E11 and E15 the first MT1 and second MT2 temperature measurement. The temperature threshold ST can thus be stored only once, during the first starting of the turbine engine 1, then be used systematically at each implementation of the detection method E. Likewise, the reception E13 and the updating E14 of the secondary detection criterion CS can be implemented before the reception E11 of the first temperature measurement MT1.

Different secondary detection criteria CS can be used in the ignition detection method E.

A first secondary criterion CS1 is information relating to the evolution of pressure at the output of the high-pressure stage 23 farthest downstream of the compressor 2 section of the turbine engine 1, relative to the air circulation direction. In fact, as illustrated in FIG. 3, during the ignition of the combustion chamber 3, a sudden increase of this pressure occurs, also called a pressure jump. Thus, this first secondary criterion CS1 will be validated if said pressure jump is detected. For this purpose, successive measurements of the pressure at the output of the high-pressure stage 23 of the compressor 2 stage are received. Advantageously, these measurements are separated by approximately a hundred milliseconds, for example 200 ms. If the deviation between the successive measurement values is greater than a certain predetermined pressure threshold, then the pressure jump is detected and the secondary criterion CS1 received is validated. Advantageously, the pressure jump threshold originates with engine tests, and amounts for example to 4% of the value of the initial pressure measurement acquired. At all events, the first secondary criterion CS1 is used only when starting of the turbine engine 1 is in progress, in order to limit its impact.

A second secondary criterion CS2 is information relating to the speed of the turbine engine 1, i.e. the speed of rotation of a rotating shaft 5, for example the high-pressure shaft 5.

This second criterion CS2 is advantageously used in the case where the turbine engine speed 1 stagnates at a speed lower than its idle threshold SR, but greater than the maximum ventilation threshold SMV. In fact, when the engine speed crosses the maximum ventilation threshold SMV, for example 7000 revolutions per minute, the combustion chamber 3 is considered to be ignited. In fact, this threshold SMV is determined to be the maximum threshold which can be crossed with only the torque provided by the starter. Without the torque produced by combustion, this threshold SMV cannot be crossed, and its crossing therefore indicates that the combustion chamber 3 is ignited. This threshold SMV can be determined experimentally by ventilation tests on the turbine engine 1.

To validate this second criterion CS2, the operating state of the turbine engine 1, corresponding to a stagnation of the engine speed, is first confirmed. To this end, the evolution of the engine speed is monitored for a predetermined duration T1, typically 20 seconds. This duration T1 corresponds to the maximum time threshold during which the engine speed can be maintained above the maximum ventilation threshold SMV without starting. This duration T1 further depends on the type of turbine engine 1 and on its level of wear. The second secondary criterion CS2 is therefore validated if the engine speed is comprised in the interval extending between its maximum ventilation threshold SMV and its idle threshold SR during the duration corresponding to the maximum time threshold T1 previously described. Advantageously, the second secondary criterion CS2 is considered to be validated if, in addition, the following conditions are satisfied during the duration corresponding to the maximum time threshold T1 previously described:

the fuel supply valve within the combustion chamber 3 is open, and the starter is shut off.

The condition relating to the opening of the supply valve allows not risking detecting a false ignition when fuel is not supplied to the combustion chamber 3. This additional validity condition allows not updating the temperature threshold ST in the case where the supply valve has been closed, i.e. when starting has been cancelled or the mission is terminated. The logic of the detection method is thus reset to zero for the following re-ignition and/or restarting.

In a second embodiment, with reference to FIG. 2b, the detection method E comprises a first step E21 of receiving a first engine speed threshold SRM1, for example the maximum ventilation threshold SMV previously described, of 7000 revolutions per minute.

During a second step E22, a measurement of the engine speed MRM is received and, according to a favored embodiment, stored.

During a third step E23, the measurement MRM received is compared to the first engine speed threshold SRM1.

During a fourth step E24, the ignition condition of the combustion chamber 3 is determined depending on the result of the comparison step E23. In this particular case, if the measurement MRM received is greater than the first engine speed threshold SMR1, then the combustion chamber 3 is considered to be ignited. In fact, as previously mentioned, the first engine speed threshold SMR1 is advantageously selected to that it indicates the bounds beyond which the turbine engine 1 could not operate without energy originating in the ignited combustion chamber 3. If the measurement MRM received is less than the first engine speed threshold SMR1, then the combustion chamber is considered to be extinguished. If necessary, an alarm can be reported to the pilot, if the extinguished condition is determined following several ignition attempts.

The steps of the second embodiment of the detection method E can be implemented in a different order from that previously described. In particular, the step of receiving E21 the first engine speed threshold SRM1 can be implemented independently of the step of receiving E22 a measurement of the engine speed MRM. The first engine speed threshold can thus be stored only once, at the first start of the turbine engine 1, then be used systematically at each implementation of the detection method E.

With reference to FIG. 2c, in a third embodiment of the detection method E complementary to the second embodiment previously described, a step of receiving E31 an acceleration threshold of the engine speed SA is implemented. The acceleration threshold SA corresponds to an increase of the engine speed such that the engine is necessarily driven by the combustion implemented within the combustion chamber 3. This acceleration threshold SA depends on the type of turbine engine 1 and its level of wear, and corresponds for example to an acceleration of the engine speed of 50 revolutions per minute at each second.

Then, a measurement time interval IT is also received E32 and, according to a favored embodiment, stored. This time interval IT is for example one second.

Thereafter, a plurality of successive measurements of the acceleration of the engine speed MA are received E33 during the time interval IT received in the previous step E32, then compared with the acceleration threshold SA received during the first step E31.

Finally, the ignition condition of the combustion chamber 3 is determined E34 depending on the results of the comparison step E33. In this case, if all the acceleration measurements MA are greater than or equal to the received threshold SA, then the combustion chamber 3 is considered to be ignited. Otherwise, the combustion chamber 3 is considered to be extinguished, and an alarm can be reported to the pilot, if the extinguished condition is determined following several ignition attempts.

This embodiment of the detection method E is advantageously implemented in order to detect re-ignition of the combustion chamber 3, when the turbine engine 1 is in operation above its maximum ventilation threshold SMV, and below its idle threshold SR.

The steps of the third embodiment of the detection method can be implemented in a different order from that previously described. In particular, the step of receiving E32, E32 an acceleration threshold SA and a time interval IT can be implemented independently of the step of receiving E33 the plurality of measurements MA of the acceleration of the engine speed. The acceleration SA and time interval IT thresholds can thus be stored only once, at the first start of the turbine engine 1, then be used systematically at each implementation of the detection method E.

With reference to FIG. 1, a turbojet 1 comprises one (or more) computer(s) 7 configured to control the operation of the turbojet 1. A computer 7 of this type conventionally comprises two channels implementing the same operations in parallel, based on the same received data. Generally, one of the two channels is subordinate to the other. The terms used are active channel and passive channel. The channels of the computer 7 receive measurements originating from one (or more) exhaust gas temperature sensor(s) 6 located downstream of the combustion chamber 3. A sensor 6, or probe, of this type, thus measures the exhaust gas temperature. A turbine engine ignition detection system 8 therefore advantageously comprises a temperature sensor 6 and a computer 7 of this type.

Moreover, the computer 7 is configured to implement an ignition detection method E according to one of the embodiments previously described. To this end, the computer 7 also receives other measurements originating from other sensors, such as for example measurements relating to engine speed, or to the pressure downstream of the compressor 2 section, for example the high-pressure stage 23.

In case of a malfunction of the passive channel, the computer 7 can be caused to be automatically re-initialized and therefore lose all calculations in progress. As a result, the system 8 must be capable of re-initializing itself to the ignition condition of the combustion chamber 3. To this end, the passive channel can first of all recover the ignition condition by communication with the active channel.

Alternatively, with reference to FIG. 2d, a fourth embodiment of the ignition detection method E of the combustion chamber 3 is implemented by the passive channel of the computer 7.

During a first step E41, a second engine speed threshold SRM2 is received and, according to one favored embodiment, stored. This second engine speed threshold SRM2 corresponds for example to the idle threshold SR previously described.

During a second step E42, information relating to the control state of the turbine engine is also received, for example pilot commands relating to power demand.

During a third step E43, a measurement of the engine speed MRM is received and, according to one favored embodiment, stored.

During a fourth step E44, the measurement MRM received in the previous step is compared to the second engine speed threshold SRM2.

During a fifth step E45, the ignition condition of the combustion chamber 3 is determined depending on the result of the comparison step E44 and information relating to the control state. In this particular case, if the engine speed is greater than or equal to its idle speed SR (i.e. the turbine engine 1 is in stable operation above its idle) and the pilot commands are consistent, then the passive channel concludes that the combustion chamber 3 is ignited and controlled by the active channel.

The steps of the fourth embodiment of the detection method E can be implemented in a different order from that previously described. In particular, the step of receiving E21 the second engine speed threshold SRM2 can thus be stores only once, on the first start of the turbine engine 1, then be used systematically at each implementation of the detection method E. Likewise, the steps of receiving E42, E43 information relating to the control state and of measuring the engine speed MRM can be reversed.

Advantageously, the different embodiments previously described are implemented in parallel by the channels of the computer 7, independently of one another. In this manner, the first control logic which detects the ignition of the combustion chamber 3 is able to send corresponding information to the pilot.

Thus, if the turbine engine 1 is started when the exhaust gas temperature probe 6 is invalid, the logic corresponding to the second embodiment of the detection method E will still allow detection of ignition of the combustion chamber 3.

In the same manner, if one or more channels of the computer 7 are reinitialized in an untimely manner, the corresponding logic of the fourth embodiment of the detection method E will still allow detection of ignition of the combustion chamber 3.

Likewise, if the engine speed stagnates after a fuel supply shutoff during starting of the turbine engine 1, the determination logic implemented will depend on the level of the stagnation speed (starting on the ground or restarting in flight).

If the engine speed is less than the maximum ventilation threshold SMV, then the first embodiment of the detection method E will allow detecting the ignition of the combustion chamber 3, by means of the first pressure jump secondary criterion CS1.

If the engine speed is transitional, then it is the second embodiment of the detection method E which will allow detecting the ignition of the combustion chamber 3, by using the maximum ventilation threshold SMV as the first engine speed threshold SRM1.

If the engine speed is greater than the maximum ventilation threshold SMV, then the first embodiment of the detection method E will allow detecting the ignition of the combustion chamber 3, by means of the second, engine speed secondary criterion CS2.

The invention claimed is:

1. A method comprising:
   before an attempt to ignite a combustion chamber of a turbine engine, receiving a first measurement of exhaust gas temperature downstream of the combustion chamber;
   receiving a temperature threshold and
   a secondary detection criterion;
   updating the temperature threshold depending on the secondary detection criterion;
   after the attempt to ignite the combustion chamber, receiving a second measurement of the exhaust gas temperature; and
   comparing the updated temperature threshold and the difference between the first measurement and the second measurement of the exhaust gas temperature and
   determining an ignition state of the combustion chamber corresponding to a success or to a failure of the ignition attempt.

2. The methodm according to claim 1, wherein receiving a first measurement of the exhaust gas temperature is implemented at an end of a phase of initiation of a starting sequence of the turbine engine, when the exhaust gas temperature is minimal.

3. The method according to claim 1, wherein updating of the temperature threshold consists of a reduction of a value of the threshold if the secondary criterion is validated, and of a retention of a value of the threshold otherwise.

4. The method according to claim 3, wherein the secondary criterion is information relating to an evolution of an output pressure downstream of a high-pressure compressor of the turbine engine, the secondary criterion being validated if a sudden increase of the output pressure is detected.

5. The method according to claim 3, wherein the secondary criterion is information relating to an engine speed of the turbine engine, the secondary criterion being validated if the engine speed is comprised in a determined interval for a predetermined duration.

6. The method according to claim 1, further comprising:
receiving a first engine speed threshold and a measurement of an engine speed; and
comparing the measurement of an engine speed to the first engine speed threshold and
determining the ignition state of the combustion chamber.

7. The method according to claim 6, further comprising:
receiving an acceleration threshold of an engine speed and a measurement time interval;
receiving a plurality of successive measurements of an acceleration of an engine speed during the measurement time interval; and
comparing the plurality of successive measurements with the acceleration threshold and
determining the ignition state of the combustion chamber.

8. The method according to claim 1, further comprising:
receiving a second engine speed threshold,
information relating to a control state of the turbine engine and a measurement of an engine speed; and
comparing the measurement to the second engine speed threshold and
determining the ignition state of the combustion chamber.

9. A system comprising an exhaust gas temperature sensor, the system further comprising a computer adapted to implement the steps of:
before an attempt to ignite a combustion chamber of a turbine engine, receiving a first measurement of exhaust gas temperature downstream of the combustion chamber;
receiving a temperature threshold and a secondary detection criterion;
updating the temperature threshold depending on the secondary detection criterion;
after the attempt to ignite the combustion chamber, receiving a second measurement of the exhaust gas temperature; and
comparing the updated temperature threshold and the difference between the first measurement and the second measurement of the exhaust gas temperature and determining an ignition state of the combustion chamber corresponding to a success or to a failure of the ignition attempt.

10. A turbine engine comprising a system according to claim 9.

* * * * *